3,769,249
THERMOSETTING PLASTICS AND
METHOD THEREFOR
Norman Bilow, Los Angeles, Calif., assignor to The
O'Brien Corporation, South Bend, Ind.
No Drawing. Continuation of application Ser. No.
105,718, Jan. 11, 1971, which is a continuation-in-part of application Ser. No. 665,285, Sept. 5,
1967, both now abandoned. This application Mar.
1, 1973, Ser. No. 337,625
Int. Cl. C08d 9/16; C08g 51/52; C10c 1/10
U.S. Cl. 260—28                                    8 Claims

ABSTRACT OF THE DISCLOSURE

The disclosure herein relates to conversion of thermoplastic materials and particularly heat softenable aromatic and heterocyclic ring materials of essentially over three aromatic rings to provide improved heat resistant, inert coating and molding compositions, and the products thereof. As exemplified herein, thermally unstable aromatic and cyclic ring pitch-plastics are converted from a thermoplastic state to a thermosetting state by admixture therewith of an aromatic polymethylol curing agent therefor, as herein described.

---

This invention is a continuation-in-part of patent application Ser. No. 105,718, filed Jan. 11, 1971, now abandoned, which is a continuation-in-part of patent application Ser. No. 665,285, filed Sept. 5, 1967 now abandoned.

The invention herein described was made in the course of or under a contract with the Air Force.

DESCRIPTION OF THE INVENTION

This invention relates to the method of converting thermoplastic polyaromatic and heterocyclic ring materials of essentially more than 3 such rings to useful thermosetting materials and the products thereof. More particularly, the invention herein concerns the method of converting natural and artificial thermoplastic materials, known as "pitch-plastics," and the like, including thermoplastic resins, which melt on heating, as exemplified by coal tar pitches, into thermosetting high-temperature resistant plastics, and the products therefor and thereof.

Synthetic resins of the character of coumarone polymers, indene polymers, polystyrene and the like, or thermoplastic aromatic resinous materials of the character of natural and synthetic pitch-plastics, including particularly coal tar pitches, which soften on heating are well known to the art. Such materials have found very broad commercial applications as plastics and in insulation, both thermal and electrical. In view of the low cost of many high molecular weight aromatic hydrocarbons, as the coal tar pitches, the art has continuously been seeking for ways and means for increasing their thermal resistance. Consequently, an improvement which converts thermoplastic polyaromatic and cyclic ring compounds and particularly relatively high molecular weight aromatic hydrocarbons of essentially more than 3 aromatic rings or heterocyclic rings as coal tar pitches, coumarone polymers, indene polymers, polystyrene, and the like polymers into hard, heat resistant, water and chemical resistant coatings and plastics is needed in the art.

It is also a principal object of this invention to provide the art with improved heat resistant thermosetting resinous pitch material with or without the addition of inert filler material.

Another object of this invention is to provide a method of rendering thermoplastic resinous materials into thermosetting high temperature resistant plastics, compositions therefor and the products thereof.

It is a further object of this invention to provide an improved process for converting thermoplastic pitch-plastic material into thermosetting high-temperature resistant material, including the compositions therefor and the products thereof.

In general, the art is familiar with thermoplastic resinous material, as indicated, and the heavy liquid or dark residue, known as pitch, obtained in the preparation and distillation of chemical, pitches and tars, including coal tar pitch, earth and mineral asphalt and bituminous material, and the like, of the character otherwise obtained from the synthesis of hydrocarbons and distillation of various tars, oils, pitches, and the like. The art is also familiar with the thermal instability of such resinous polymers and pitch material and has long sought ways and means for extending the uses and applications thereof with a proper curing agent therefor.

The curing agents for combination with the above-described thermoplastic materials are preferably the polymers and telomers prepared as polyoxyxylylenes of the character hereinafter exemplified and as defined in the herewith-filed application "Aromatic Resinous Curing System and Method," Ser. No. 665,303, by Norman Bilow and Leroy J. Miller, included herein by reference thereto. While it is possible to combine the monomer form of curing agent and catalyst with the thermoplastic aromatic material, and an in-situ reaction affected by heating the mixture, it is preferred that the thermoplastic material be combined with the curing material, in prepolymer form, as hereinafter illustrated and described. As preferably utilized herein, the curing agents are polymers derived from aromatic polymethylol compounds, such as dimethylol-benzenes and derivatives thereof, having structures such that the methylol groups are on the same or different benzene rings. Symbolic or characteristic structural formulas of the copolymerizable curing agent material are indicated as follows:

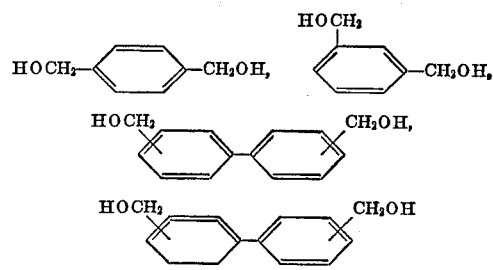

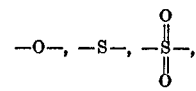where X may be $$-O-, -S-, -\overset{O}{\underset{O}{\overset{\|}{S}}}-,$$

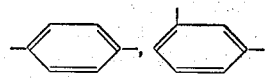alkylene as —CH₂—, aryl as and other alkylene or arylene groups. Other groups present on the aromatic rings may be hydrogen, additional methylol groups, and non-interfering alkyl, aryl, aralkyl, alkaryl and halogen groups, and mixtures of the same. Examples of some of the identifying compounds of this character are p-xylylene glycol; m-xylylene glycol, 1-methyl-2,5-dimethylolbenzene; 1-phenyl-3,5-dimethylolbenzene; 4,4'-dimethylolbiphenyl, and the like, including mixtures of such materials.

These materials are of the character described in more detail in the above indicated cofiled application, and included herein by reference thereto.

The acid or catalyst component used in producing the polymers and telomers of the above, and as herein provided is preferably an aromatic sulfonic acid such as para-toluenesulfonic acid, benzenesulfonic acid, acetamido-benzenesulfonic acid, hexanesulfonic acid, cyclohexanesulfonic acid and the like, including mixtures thereof. Less preferably, there may be employed such acid catalysts as sulfuric acid, derivatives thereof, the mono- and polyorgano-substituted mineral acids, phosphoric acid, alkyl phosphonic acids, aryl phosphonic acids, alkyl phosphonous acids, aryl phosphonous acids, sulfinic acids, and mixtures of such acid materials. Further, sulfonyl halides, such as bromobenzenesulfonyl chloride or benzenesulfonyl bromide, can be used as a catalyst in place of the acid. Such catalyst can also be used in combination with a free acid polymerization catalyst or additional acid which effects copolymerization of the polymethylol curing agent material or curing of the thermosetting material. When the pitch-plastic is mixed with the polymethylol compound, in monomer form, the sulfonyl halide catalyst is preferably utilized as it provides a more easily prepared homogeneous reaction mixture.

For example, in the case where relatively weak organic acids or catalysts are employed, small catalytic amounts of stronger mineral acids may be added to promote the condensation reaction and esterification reaction. The acid which is used to enter the polymer molecule and terminate the polymer as an ester group may be the same acid used to catalyze the condensation reaction. On the other hand, a strong acid may be used in catalytic amounts to promote the condensation reaction and another acid employed to terminate the polymer as an ester group. Mixtures of acids can be used to form the terminal ester groups. Hydroxyl-terminated polymers can be prepared during the course of the condensation reaction which can subsequently be esterified with a desired esterifying material.

Illustrative of the polymers and telomers are those derived from aromatic polymethylol compounds, as indicated, having a structure or mixture of structures which may be illustrated by reference to the structure of the xylylene glycol condensation polymer derivatives as represented by:

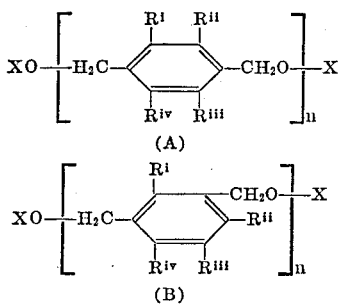

"A" and "B" represent the preferred type structures of the polyoxyxylylene telomers or polymers utilized herein. In such representation, $n$ represents the extent of polymerization and may be two or more. X represents either hydrogen or an acid group where acid group refers to strong acids with an OH group abstracted. Examples of the acids from which such groups are derived are toluenesulfonic acid, benzenesulfonic acid, acetamidobenzenesulfonic acid, hexanesulfonic acid, cyclohexanesulfonic acid, phosphoric acid, arylphosphonous acid, sulfuric acid, strong alkyl- and arylcarboxylic acids, especially substituted halogen derivatives of the same, and mixtures of the same. $R^I$, $R^{II}$, $R^{III}$, $R^{IV}$ can be non-interfering hydrogen, alkyl, aryl, aralkyl, alkaryl, alkoxy, or aryloxy, and mixtures of the same, including partially halogenated derivatives thereof, with the plural methylol groups on the same or different and adjacent or associated benzene rings connected either by a covalent bond or by oxygen, sulfur, an alkylene group or an arylene group.

The following are nonlimiting examples illustrative of the compositions of thermosetting aromatic plastic materials combined with the non-phenolic aromatic polymethylol and acid or catalyst compounds herein described, including their method of preparation, affording completely new fields of copolymer compositions useful in the arts as such and as products useful in the coating and plastic art. The relative hardness of the thermosetting plastic is under the optional control of the operator by his properly mixing more or less of the curing agent material and catalyst therefore with the thermoplastic. A lesser proportion of curing agent material can be used to reduce the hardness factor or a higher portion of curing agent material to the thermoplastic can be used to increase the hardness factor of the thermoset composition.

Exemplary of the thermoplastic aromatic compounds which are convertible to thermoset plastic material of a desirable hardness are the following examples of converting low cost coal tar pitch, as a pitch-plastic, into high-temperature resistant material of improved thermal stability having improved commercial applications in thermal and electrical insulation installations.

EXAMPLE I 3.3 grams p-xylylene glycol, 1.0 gram of p-toluenesulfonic acid monohydrate and 40 ml. of chloroform are heated at reflux, with removal of water, for 24 hours. This solution is combined with a solution of coal tar pitch, 6.6 grams (conventional aromatic mixture of natural or artificial phenyl and phenylene material with essentially higher polymers or monomers of more than three aromatic rings, which may contain some inherently non-interfering modification dissolved in a mutually suitable solvent as chloroform or trichloroethylene, 15 ml.). A mixture of solvents can also be used. The combined mixture is then heated at reflux for 24 hours. To prepare laminates the varnish is used to coat a reinforcing fabric which is subsequently dried thoroughly. After drying a laminate was molded in a conventional mold under pressure and thermoset by heating at a temperature above 150° C.

As herein embodied and exemplified the above is representative of heat softening thermoplastic synthetic or natural aromatic and heterocyclic hydrocarbon of heavy liquid or plastic pitch materials to convert them from a thermoplastic state to thermosetting state resistant to high temperatures dependent upon the operator's selection of reactants and ratios. Such materials are of natural or synthetic occurrence and obtained in the preparation or distillation of pitches, oils, tars, coumarone polymers, indene polymers, earth and mineral asphalt and bituminous material. Further, many of such materials are known and referred to by the publications of Ellis, "The Chemistry of Synthetic Resins."

EXAMPLE II

This example is similar to Example I except that 10 grams of coal tar pitch and 25 ml. of 1,1,2,2-tetrachloroethane solvent, as herein indicated, are used.

EXAMPLE III

A mixture of 60 g. of 1,4-benzenedimethanol, 18.84 g. of p-toluenesulfonic acid monohydrate and 200 ml. of chloroform was heated under reflux for 20 hours. Water was removed continuously from the reaction mixture by azeotropic distillation, the water being separated from the chloroform in a trap and the chloroform being returned to the reaction mixture. The volume of the resulting solution was 250 ml.

To 24.0 ml. of the above solution were added 12.0 g. of a thermoplastic coumarone-indene resin and 24.0 ml. of chloroform. A clear brown varnish was obtained by heating this solution at reflux for 15 hours. This varnish was used to coat and impregnate glass cloth. The solvent was removed by drying the cloth for 30 minutes at room temperature, then for 30 minutes at 160° F., and finally for 30 minutes at 220° F. The coated cloth was cut to fit a mold, and the stacked plies were heated for 2 hours at 400° F. under 3000 p.s.i. A strong, cured, laminated product was obtained having 45% resin by weight.

The varnish could also be mixed with clay as an inert filler, and after removing the mixture, could be cured by heating to form a strong, cured product having application as a structural material.

EXAMPLE IV

This example is similar to Example I except that 13 grams of conventional aromatic coal tar pitch and 30 ml. of halogenated solvent, as herein indicated, are used.

EXAMPLE V

A solution of conventional aromatic coal tar pitch (10 grams) xylylene glycol (1 gram), and benzene trisulfonyl chloride (5 grams) was prepared using chloroform as a solvent. The mixture was heated at reflux for about 16 hours. Upon cooling, it can be used as a varnish as in Example I. Otherwise, the solvent can be removed with retention of fusibility and the copolymers molded or mixed with natural or synthetic filler and modifying materials and the curing completed by heating and reacting the aromatic with the polymethylol and acid catalyst material initially at 175° C. advanced to 300° C. for a period of about 1 hour.

EXAMPLE VI

Similar to Example V except that 15 grams of conventional aromatic coal tar pitch is used. This produced a somewhat softer and more flexible copolymer.

EXAMPLE VII

Similar to Example VI except that the coal tar pitch was modified with addition of polystyrene polymers (5 grams), xylylene glycol (2 grams) and benzene disulfonyl bromide (7 grams). The mixtures of the reactive components can be made in proportions the operator desires for effecting differences in plasticity and hardness.

Alternatively, the above and like mixtures of the herein described material can be prepared in a dry state, with or without solvent, when mixed and heated at a melt temperature. The mixture portions and period of heating will depend upon the product desired for its solvent solubility and/or hardness.

As illustrated by the above, the thermoplastic material or "pitch plastic," as coal tar pitch, or the like, as described, when mixed with the soluble curing agent as, for example, a chloroform-soluble telomer of xylylene glycol and toluenesulfonic acid, as described, the mixture, in a dry melted form or solvent form becomes a coating and impregnant that is moldable and curable, under heat and pressure, providing useful plastic thermoset srtuctures. These structures, after cure at about 200°±50° C. and from a few hundred up to 3000 p.s.i. pressure and postcure up to about 300° C. are exceedingly heat resistant and show very little, if any, degradation in inert atmospheres at 400° C. As indicated, the mixtures may be made in monomer, partial polymer and polymer forms for effecting an in-situ partial or complete curing.

If desired, upon mixture or after partial reaction, in solvent form, as described, the solvent may be removed without overheatsetting the mixture, to provide a thermosetting plastic which is resoluble or redispersible in a solvent therefor, as chloroform, a halogenated benzene, trichloroethylene, tetrachloroethane, toluene and the like, or mixture of solvents therefor.

As further illustrated, the heat curable mixture preparation can be used to coat, mixed with or include a filler of inert material as sand, clay, earth, natural and synthetic fibers, reclaimed rubber, metal oxides, other material, wood pulp, and the like to provide a moldable impregnant or otherwise applied as a coating, which is heat curable. The hardness of the cured composition can be controlled by the proportional relationship of the curing agent to the thermoplastic material. Thus, by suitable mixture, from a soft, resilient to hard thermoset molding, impregnated and heat resistant surfacings can now be provided.

Having described and exemplified embodiments of my discoveries and improvements provided in accordance with the patent statutes, it will now be apparent that some modifications and variations thereof may be made without departing from the spirit and scope thereof. The specific embodiments are provided by way of illustration of my discoveries, invention or improvements which are to be limited only by the terms of the appended claims.

I claim:
1. The method of preparing a thermosetting copolymer comprising heating a mixture of
    (a) coal tar pitch or coumarone-indene polymers,
    (b) a compound selecting from the group consisting of p-dimethylol benzene, m-dimethylol benzene, dimethyloldiphenyl, dimethylol diphenylether, dimethylol diphenyl sulfide, dimethylol diphenyl sulfone, dimethylol diphenyl methane, and a polymer thereof, and
    (c) an acid catalyst to a temperature at which the mixture is fluid and causes formation of water of condensation while simultaneously removing said water of condensation and recovering organic solvent soluble reaction product.
2. The product produced by the method of claim 1.
3. The method of claim 1 wherein (a) is aromatic coal tar pitch and (b) plus (c) is a solvent soluble polymer of p-dimethylol benzene and p-toluene sulfonic acid or benzene sulfonic acid, and the organic solvent soluble reaction product is subsequently heat-cured.
4. The method of claim 1 wherein said heating is carried out under reflux in a mutual solvent for (a), (b) and (c), and said organic solvent soluble reaction product is recovered by removal of said solvent.
5. The method of claim 1 wherein resultant reaction mixture is retained in solution lacquer form.
6. The method of claim 1 wherein (b) and (c) are prereacted to form a polymer of the formula

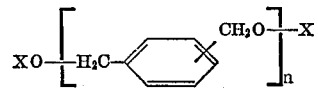

wherein X is H or an acid ester group and at least one X is an acid ester group, $n$ is at least 2, and the $CH_2O$ group in meta or para position to the $H_2C$ group.
7. The product produced by heat-curing the organic solvent-soluble reaction product of claim 1.
8. The product produced by the method of claim 3.

References Cited
UNITED STATES PATENTS 3,116,265  12/1963  Huang et al. _____ 260—823

ALLAN LIEBERMAN, Primary Examiner

S. L. FOX, Assistant Examiner

U.S. Cl. X.R.

208—44; 260—28.5 C, 823

PO-1050
(5/69)

UNITED STATES PATENT OFFICE
CERTIFICATE OF CORRECTION

Patent No. 3,769,249      Dated October 30, 1973

Inventor(s) Norman Bilow

It is certified that error appears in the above-identified patent and that said Letters Patent are hereby corrected as shown below:

Col. 1, line 4, "assignor to The O'Brien Corporation, South Bend, Ind."

should be

--assignor to Hughes Aircraft Company, Culver City, Calif.--

Signed and sealed this 14th day of May 1974.

(SEAL)
Attest:

EDWARD M.FLETCHER,JR.
Attesting Officer

C. MARSHALL DANN
Commissioner of Patents